(12) United States Patent
Most et al.

(10) Patent No.: US 11,052,573 B2
(45) Date of Patent: Jul. 6, 2021

(54) METHOD OF FABRICATING BOTH A WOVEN FIBER PREFORM AND A COMPOSITE MATERIAL PART

(71) Applicant: SAFRAN AIRCRAFT ENGINES, Paris (FR)

(72) Inventors: Vincent Bernard Serge Most, Moissy-Cramayel (FR); Marc-Emmanuel Jean François Techer, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 135 days.

(21) Appl. No.: 16/464,546

(22) PCT Filed: Nov. 20, 2017

(86) PCT No.: PCT/FR2017/053163
§ 371 (c)(1),
(2) Date: May 28, 2019

(87) PCT Pub. No.: WO2018/100263
PCT Pub. Date: Jun. 7, 2018

(65) Prior Publication Data
US 2020/0376716 A1    Dec. 3, 2020

(30) Foreign Application Priority Data
Nov. 29, 2016 (FR) ...................................... 1661642

(51) Int. Cl.
*B29B 11/16* (2006.01)
*C08J 5/24* (2006.01)
(Continued)

(52) U.S. Cl.
CPC ................. *B29B 11/16* (2013.01); *C08J 5/24* (2013.01); *D03D 15/47* (2021.01); *D03D 25/005* (2013.01);
(Continued)

(58) Field of Classification Search
CPC ........ D03D 15/00; D03D 25/005; D03D 1/00; D03D 2700/014; D10B 2101/12;
(Continued)

(56) References Cited

U.S. PATENT DOCUMENTS

| 3,461,025 A | 8/1969 | Coleman et al. |
| 6,660,336 B1 | 12/2003 | Frenken et al. |
| 2013/0276421 A1 | 10/2013 | Miura et al. |

FOREIGN PATENT DOCUMENTS

| CN | 1670105 A | 9/2005 |
| CN | 103282565 A | 9/2013 |

(Continued)

OTHER PUBLICATIONS

International Search Report as issued in International Patent Application No. PCT/FR2017/053163, dated Feb. 21, 2018.
(Continued)

*Primary Examiner* — Camie S Thompson
(74) *Attorney, Agent, or Firm* — Pillsbury Winthrop Shaw Pittman LLP

(57) ABSTRACT

A method of fabricating a woven fiber preform that is impregnated with a matrix-precursor resin, the resin, in the raw state, presenting a glass transition temperature $Tg^0$, includes: impregnating yarns or strands with the resin; feeding a loom with the impregnated yarns or strands maintained at a temperature in the range $Tg^0$ to $Tg^0+10°$ C.; and weaving the yarns or strands in the loom in order to obtain the resin-impregnated woven fiber preform.

5 Claims, 2 Drawing Sheets

(51) Int. Cl.
  *D03D 25/00* (2006.01)
  *D03J 1/02* (2006.01)
  *D03D 15/47* (2021.01)
  *B29K 307/04* (2006.01)
  *D03D 1/00* (2006.01)

(52) U.S. Cl.
  CPC ............. *D03J 1/02* (2013.01); *B29K 2307/04* (2013.01); *C08J 2363/00* (2013.01); *D03D 1/00* (2013.01); *D10B 2101/12* (2013.01); *D10B 2403/024* (2013.01); *D10B 2403/033* (2013.01); *D10B 2505/02* (2013.01)

(58) Field of Classification Search
  CPC .......... D10B 2403/033; D10B 2331/04; D10B 2401/041; B32B 2260/021; B32B 2260/046; B32B 7/08; Y10T 428/298; Y10T 428/2396; Y10T 428/2907; Y10T 442/3041; C08J 2363/00; B29K 2063/00; B29K 2307/04

USPC ....... 428/175, 361, 96, 401, 292.1; 156/161; 442/186; 139/97
  See application file for complete search history.

(56) References Cited

FOREIGN PATENT DOCUMENTS

| | | |
|---|---|---|
| JP | H04-192496 A | 7/1992 |
| JP | H08-269882 A | 10/1996 |
| WO | WO 01/70855 A1 | 9/2001 |
| WO | WO 2006/136755 A2 | 12/2006 |

OTHER PUBLICATIONS

International Preliminary Report on Patentability and the Written Opinion of the International Searching Authority as issued in International Patent Application No. PCT/FR2017/053163, dated Jun. 4, 2019.

METHOD OF FABRICATING BOTH A WOVEN FIBER PREFORM AND A COMPOSITE MATERIAL PART

CROSS-REFERENCE TO RELATED APPLICATIONS

This application is the U.S. National Stage of PCT/FR2017/053163, filed Nov. 20, 2017, which in turn claims priority to French patent application number 1661642 filed Nov. 29, 2016. The content of these applications are incorporated herein by reference in their entireties.

BACKGROUND OF THE INVENTION

The present invention relates to the general field of methods of fabricating both woven fiber preforms and composite material parts comprising fiber reinforcement densified by a matrix.

The use of composite materials is nowadays common practice in the field of aviation, for the purpose of reducing the weight of parts in order to increase the overall efficiency of an engine. For example, the blades or the casing of the fan of an aviation turbine engine are nowadays fabricated out of organic matrix composite material.

In order to fabricate parts of complex shape, such as those mentioned above, it is known in particular to make use of a method of molding by injecting resin known as resin transfer molding (RTM). That well-known method consists in taking a previously-woven dry fiber preform, shaping it in a mold, and then injecting resin into the pores of said preform in order to obtain the composite material part after subjecting the resin to polymerization heat treatment.

Nevertheless, the RTM method presents drawbacks. In order to provide the part fabricated in that way with good mechanical strength, it is generally necessary to increase the toughness of the resin by adding additives thereto, which also increases its viscosity. Such a more viscous resin is difficult to use in the RTM method because of the large injection pressures that it requires. In addition, during injection, preferred paths become formed for the resin within the preform, thereby leaving pores in the final part that are difficult to eliminate. Likewise, when using twisted fiber strands, the injected resin generally has greater difficulty in plugging the micropores present between the fibers and between the strands. Finally, the above-mentioned problems reduce the uniformity of the polymerization reaction while the resin is being cured, and in the long run, that can lead to internal stresses being created in the final part, thereby reducing its lifetime.

Methods are also known that make use of plies that are pre-impregnated with resin, also known as "prepregs". The use of prepregs makes it possible to use resins that are more viscous than in the RTM method, and to have a matrix with improved toughness. Nevertheless, prepregs are generally in the form of two-dimensional fabrics that are poorly adapted to fabricating complex three-dimensional parts.

There therefore exists a need for a method of fabricating a composite material part that presents improved mechanical strength and that does not present the above-mentioned drawbacks.

OBJECT AND SUMMARY OF THE INVENTION

A main object of the present invention is thus to mitigate such drawbacks by proposing, in a first aspect, a method of fabricating a woven fiber preform that is impregnated with a matrix-precursor resin, said resin, in the raw state, presenting a glass transition temperature $Tg^0$, the method comprising:
  impregnating yarns or strands with the resin;
  feeding a loom with the impregnated yarns or strands maintained at a temperature in the range $Tg^0$ to $Tg^0+10°$ C.; and
  weaving the yarns or strands in the loom in order to obtain the resin-impregnated woven fiber preform.

The term "resin in the raw state" or "raw resin" is used to mean a resin that has not yet been cured or exposed to a temperature at which its polymerization or curing can start. In other words, $Tg^0$ corresponds to the glass transition temperature of a resin that presents a degree of polymerization that is substantially zero. It is thus possible to distinguish between $Tg^0$ and $Tg^\infty$ which corresponds to the glass transition temperature of the cured resin, i.e. in which polymerization has been totally or almost totally completed. In general manner, the raw glass transition temperature $Tg^0$ is less than the glass transition temperature $Tg^\infty$ of the polymerized resin.

The method of the invention for fabricating a fiber preform serves to obtain a resin-impregnated woven preform, e.g. obtained by three-dimensional or multilayer weaving. The resulting fiber preform can thus constitute the fiber reinforcement for a composite material part of complex shape. In addition, the preform can be impregnated with resins that are more viscous than those typically used in an RTM method since no injection is needed for impregnating and densifying the preform. By way of example, such resins are the known resins that are used in prepregs. It thus becomes possible to benefit from the high toughness of those resins in a part having fiber reinforcement that has been obtained by three-dimensional weaving. A method of fabricating such a part is described in detail below.

The term "three-dimensional weaving", or "3D weaving", or "multilayer weaving" is used herein for a weaving technique in which at least some of the warp yarns interlink weft yarns over a plurality of weft layers. In known manner, such weaving may be performed in a loom of the Jacquard type.

The glass transition temperature of the resin in the raw state may be the glass transition temperature as measured by differential scanning calorimetry (DSC) performed on the resin in the raw state.

In general, the temperature at which the yarns are maintained in order to feed the loom should be selected as a function of the type of resin used. More precisely, this temperature must not be less than the $Tg^0$ of the raw resin in order to ensure that the resin is not too brittle and in order to avoid damaging the yarns or strands as they pass through the loom. In addition, the temperature should not exceed $Tg^0+10°$ C. in order to avoid the resin becoming too liquid and sticky, which would make it difficult to weave the pre-impregnated yarns or strands in the loom and would lead to the loom becoming clogged.

In an implementation, the yarns or strands may be made of carbon or of silicon carbide.

In an implementation, the resin may be a thermosetting epoxy resin. For example, the resin used may be a commercial resin such as that sold under the reference "HexPly® 8552" by the supplier Hexcel, or indeed the resin "CYCOM® 934" from the supplier Cytec. The resin used may also be a resin of the bismaleimide (BMI) family, or indeed a thermoplastic resin.

In an implementation, the resin-impregnated yarns or strands may be present in a refrigerated enclosure feeding the loom with resin-impregnated yarns or strands. The yarns or strands may be stored in the refrigerated enclosure, or in a variant they may merely pass through it prior to being woven.

In an implementation, the yarns or strands may be woven by three-dimensional weaving.

In a second aspect, the invention also provides a method of fabricating a composite material part comprising fiber reinforcement densified by a matrix, the method comprising the following steps:

fabricating a woven fiber preform that is impregnated with a matrix-precursor resin by means of a method as described above;

placing the fiber preform in a cavity of a mold having the shape of the part that is to be fabricated;

heating the fiber preform to a softening temperature of the resin in order to liquefy the resin;

eliminating the air present in the fiber preform;

compacting the fiber preform in the mold;

subjecting the resin present in the pores of the fiber preform to polymerization heat treatment so as to obtain a composite material part; and unmolding the composite material part.

The air present in the fiber preform can be eliminated by evacuating the mold cavity, or by establishing a vacuum in a closed enclosure in which the mold is present. Preferably, the air present in the fiber preform is eliminated simultaneously with or after heating the fiber preform to a softening temperature of the resin so that bubbles of air escape better from the preform. In known manner the softening temperature of the resin may be the temperature at which the viscosity of the resin reaches a minimum, or indeed the temperature that enables bubbles of air present in the preform to be discharged. Compacting the fiber preform in the mold makes it possible to discharge any surplus resin present in the preform, and this may be accompanied by a stage of maintaining a compacting pressure on the mold and/or of reinjecting surplus resin into the mold in order to maintain a uniform pressure inside the mold cavity.

By performing such a method, the pores in the preform are filled uniformly with resin, thereby ensuring that no residual pores are present. Thus, the resin can be polymerized or cured in a manner that is uniform throughout the impregnated preform, thereby reducing the presence of internal stresses in the final part. The method of the invention thus makes it possible to make composite material parts having fiber reinforcement, e.g. obtained by three-dimensional weaving, together with a matrix obtained from resins presenting greater toughness and that are more viscous than the resins used in RTM methods, which could not be envisaged beforehand.

In an implementation, the fabricated part may be a fan blade or a fan casing for an aviation turbine engine.

In an implementation, the step of compacting the fiber preform in the mold may include taking surplus resin that has been discharged from the preform and reinjecting it into the mold so as to maintain a uniform pressure inside the mold cavity.

Finally, in a third aspect, the invention provides an installation for fabricating a woven fiber preform that is impregnated with a matrix-precursor resin, the installation comprising: a loom, an enclosure storing resin-impregnated yarns or strands, the enclosure being configured to feed the loom with yarns or strands. In accordance with the invention, the temperature inside the enclosure lies in the range from the glass transition temperature $Tg^0$ of the resin in the raw state to $Tg^0+10°$ C.

In an embodiment, the loom may be in the enclosure.

BRIEF DESCRIPTION OF THE DRAWINGS

Other characteristics and advantages of the present invention appear from the following description given with reference to the accompanying drawings, which show an implementation having no limiting character. In the figures.

DETAILED DESCRIPTION OF THE INVENTION

Figure 1:
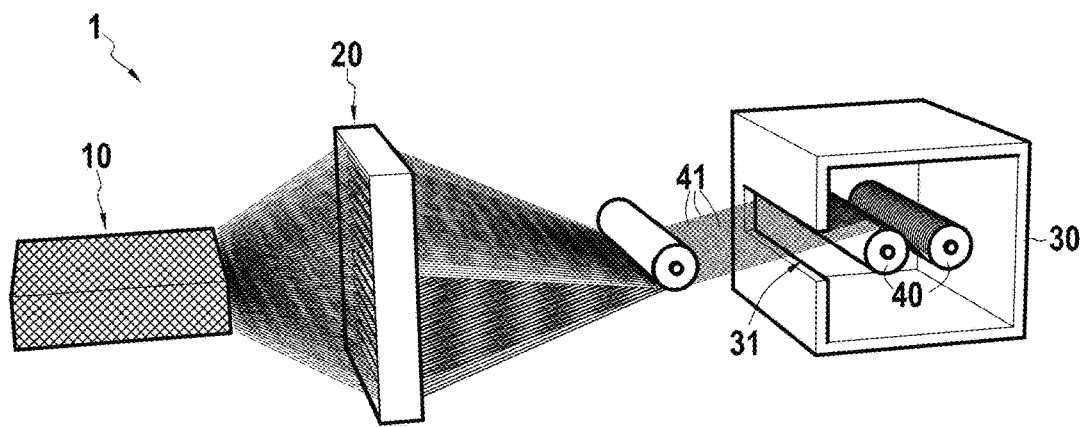
FIG. 1 is a highly diagrammatic view of an example installation for performing a method of the invention for fabricating a resin-impregnated woven fiber preform.

FIG. 1 is a highly diagrammatic view of an installation 1 for making a resin-impregnated fiber preform 10. The installation 1 comprises a loom 20, e.g. of the Jacquard type, and an enclosure 30 situated upstream from the loom (in the travel direction of the yarns for weaving going towards the loom). Rolls 40 of yarns or strands 41 that are pre-impregnated with resin are stored inside the enclosure 30. The enclosure 30 has an opening 31 allowing the yarns or strands on the rollers 40 to be fed to the loom 20. In accordance with the invention, the temperature inside the enclosure 30 lies in the range from the glass transition temperature $Tg^0$ of the resin in the raw state to $Tg^0+10°$ C. such that the yarns or strands 41 that are fed to the loom 20 are at the temperature of the enclosure 30.

In a variant that is not shown, the installation may comprise the loom 20, the rollers 40, and an enclosure cooled to a temperature lying in the range $Tg^0$ to $Tg^0+10°$ C. in which the loom 20 and the rollers 40 are present.

Still in a variant that is not shown, the yarns or strands 41 may be dry on the rollers 40 and may pass through a bath of resin while they are being conveyed to the loom so as to impregnate them with resin before they are woven. Under such circumstances, care should be taken that the impregnated yarns or strands are at the right temperature before being woven.

The yarns or strands 41 may be made of carbon, of ceramic such as silicon carbide SiC, of glass, or indeed of aramid. The resin may be selected from epoxy resins, and it may possibly include additives for increasing its toughness.

In order to obtain a resin-impregnated woven fiber preform, the pre-impregnated yarns or strands 41 coming from the rollers 40 stored in the enclosure 30 are woven by using the loom 20. The temperature at which said yarns or strands 41 are maintained enables them to be woven without clogging the loom 20 since the resin is neither too brittle nor too liquid or sticky. As mentioned above, the weaving may be three-dimensional, but it could equally well be multilayer or two-dimensional. In the example shown, the three-dimensional weaving may be weaving with an "interlock" weave, in known manner. Other known types of multilayer weaving could be used, such as in particular those described in Document WO 2006/136755.

An example of a method of the invention for fabricating a composite material part is described below with reference to FIGS. 2A to 2D.

After obtaining a fiber preform 10 that has been woven and that is impregnated with resin as described above, the preform 10 is trimmed and yarns projecting out from layers are cut away, and then the preform 10 is positioned in a mold 50. The mold 50 that is shown diagrammatically in the figures comprises a support-forming portion 51 and a countermold 52 that between them define a hollow cavity 53 in which the preform 10 is placed. The cavity 53 presents a shape and dimensions that correspond to the part that is to be fabricated. The part forming the support 51 in this example has gaskets 54 to provide the mold 50 with sealing when it is closed. In the example shown, the mold 50 also has a vent 55.

Figure 2A:
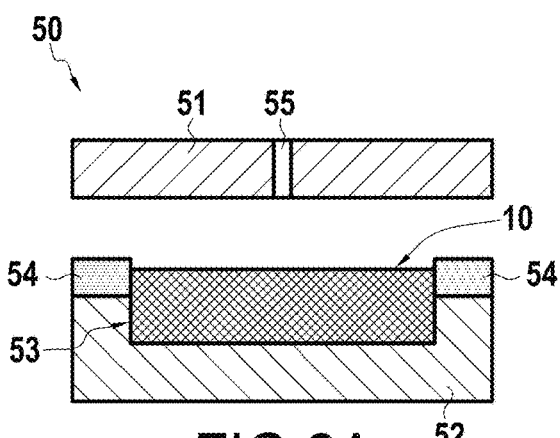
FIGS. 2A to 2D show various steps in an example method of the invention for fabricating a composite material part.
Figure 2B:
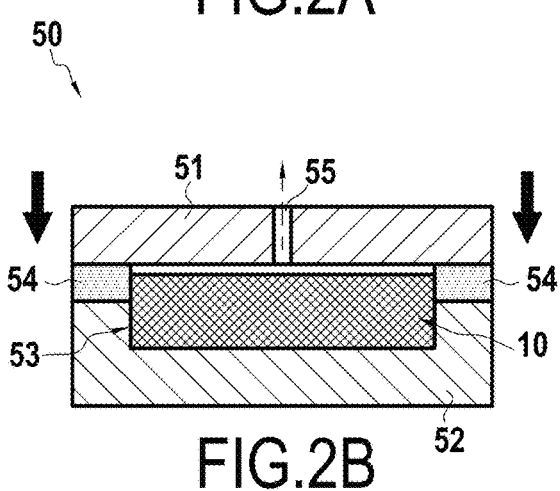

Thereafter, the mold 50 may be closed progressively, as shown in FIG. 2B. Beforehand, after or during closure of the mold 50, the preform 10 is heated to the softening temperature of the resin. When the mold 50 is closed in sealed manner and the resin present in the preform 10 has softened or liquefied, it is then possible to eliminate the air present in the cavity 53 by pumping a vacuum. In this example, air is evacuated from the cavity 53 via the vent 55. After these steps, a preform 10 is obtained that is impregnated with resin throughout all of its internal pores and that is exempt from bubbles of air.

Figure 2C:
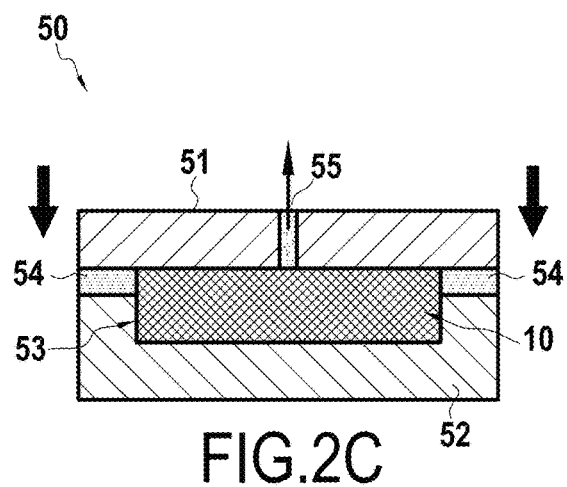

Thereafter, a compacting pressure may be applied on the mold 50 in order to shape the preform and expel surplus resin present in the preform, as shown in FIG. 2C. This surplus may be removed via the vent 55 by means that are not shown. In addition, it is possible to maintain a uniform pressure inside the cavity 53 by reinjecting a fraction of the resin that has been removed during compacting.

Figure 2D:
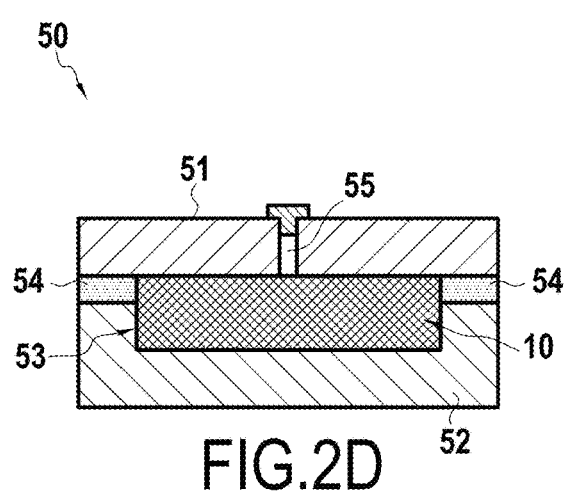

Finally, the mold 50 is heated, preferably in uniform manner, so as to initiate polymerization (curing) of the resin present in the preform 10 and densify the preform 10 (FIG. 2D). After curing, this produces a composite material part that can subsequently be unmolded and on which it is possible to perform finishing operations.

Figure 3A:
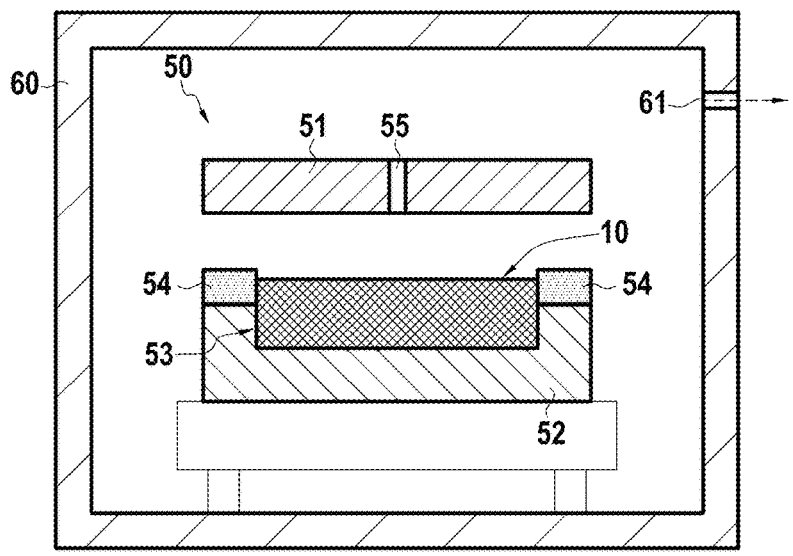
FIGS. 3A to 3C show various steps in a variant method of the invention for fabricating a composite material part.
Figure 3B:
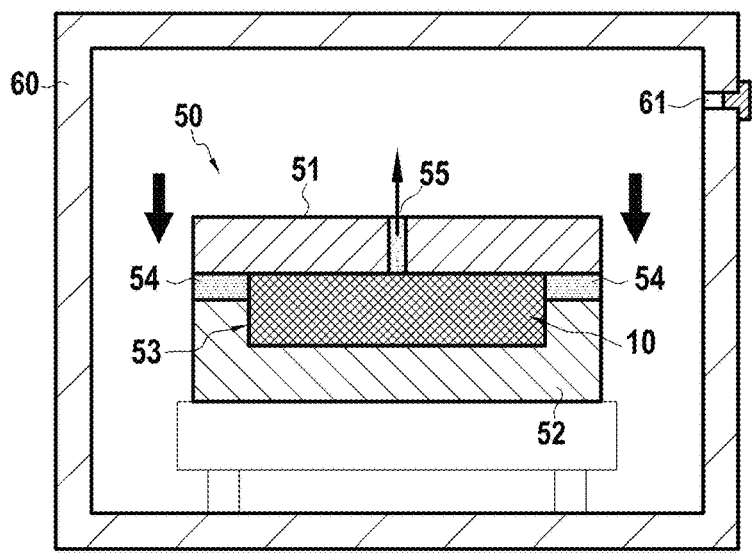
Figure 3C:
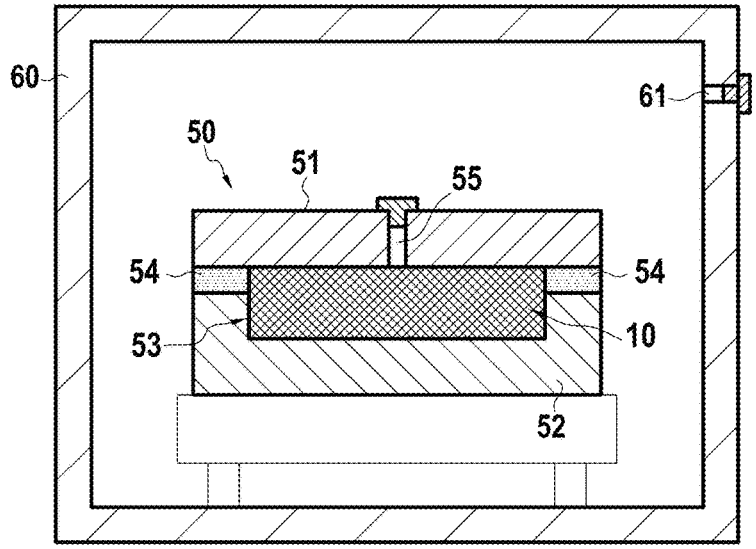

Another implementation of a method of the invention is shown in FIGS. 3A to 3C.

In this implementation, the mold 50 is placed in a sealed enclosure 60 that is provided with a vent 61. Unlike the implementation shown in FIGS. 2A to 2D, the air present in the impregnated preform 10 is eliminated by evacuating the enclosure 60 (FIG. 3A) and not directly by evacuating the inside of the closed mold 50. As a result, the mold 50 may be closed after the step of eliminating the air present in the preform 10. As above, the mold is then closed, and a compacting pressure is applied on the mold 50 (FIG. 3B) in order to shape the preform and expel the surplus resin. Finally, the mold 50 is heated in order to polymerize the resin, densify the preform 10, and obtain the final part (FIG. 3C).

The part can then be unmolded.

The method of the invention for fabricating a composite material part is shown above by using a mold comprising a portion forming a support and together with a countermold. It should be observed that in a variant it is possible to use other known means for densifying the preform, for example an installation having a vacuum diaphragm arranged in an autoclave.

In the present disclosure, the term "lying in the range . . . to . . . " should be understood as including the bounds.

EXAMPLE

An aviation turbine engine fan blade is to be fabricated out of organic matrix composite material by a method of the invention. The following steps are performed in succession:

impregnating carbon fiber strands with a resin sold under the reference HexPly® 8552 from the supplier Hexcel, the glass transition temperature $Tg^0$ of the resin in the raw state as given by its manufacturer and as obtained by DSC being about −4° C. (−3.95° C.);

placing strands in the form of a roll in a chest refrigerated to 0° C., the chest having openings allowing a loom to be fed with said strands;

weaving the strands maintained at 0° C. in the loom by three-dimensional weaving so as to obtain a resin-impregnated woven fiber preform for a blade;

optionally using shears to cut the woven preform;

placing the preform in the cavity of the mold having the shape of the blade that is to be fabricated;

heating the mold to a temperature of 100° C. in order to soften the resin;

closing the mold and evacuating the inside of the cavity so as to remove the air present in the preform;

applying a compacting pressure on the mold in order to shape the preform and impart uniform pressure within the mold cavity, possibly reinjecting resin that has been discharged from the preform during this step, should that be required;

heating the mold up to 110° C. for 150 minutes after a progressive rise in temperature in order to polymerize the resin;

unmolding the resulting blade; and optionally performing finishing operations.

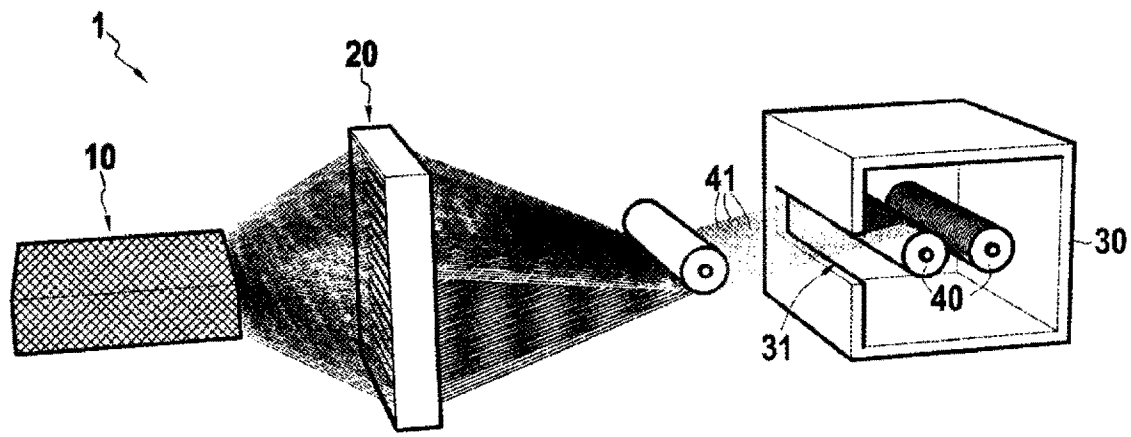

The invention claimed is:

1. A method of fabricating a woven fiber preform that is impregnated with a matrix-precursor resin, said resin, in the raw state, presenting a glass transition temperature $Tg^0$, the method comprising:

impregnating yarns or strands with the resin;

feeding a loom with the impregnated yarns or strands maintained at a temperature in the range $Tg^0$ to $Tg^0+$10° C.; and weaving the yarns or strands in the loom in order to obtain the resin-impregnated woven fiber preform.

2. A method according to claim 1, wherein the yarns or strands are made of carbon or of silicon carbide.

3. A method according to claim 1, wherein the resin is a thermosetting epoxy resin.

4. A method according to claim 1, wherein the resin-impregnated yarns or strands are present in a refrigerated enclosure feeding the loom with resin-impregnated yarns or strands.

5. A method according to claim 1, wherein the yarns or strands are woven by three-dimensional weaving.

* * * * *

UNITED STATES PATENT AND TRADEMARK OFFICE
CERTIFICATE OF CORRECTION

PATENT NO. : 11,052,573 B2
APPLICATION NO. : 16/464546
DATED : July 6, 2021
INVENTOR(S) : Vincent Bernard Serge Most et al.

It is certified that error appears in the above-identified patent and that said Letters Patent is hereby corrected as shown below:

On the Title Page

Please delete Title Page and replace with attached Title Page.

In the Claims

Please add Claims 6-10:
6. A method of fabricating a composite material part comprising fiber reinforcement densified by a matrix, the method comprising:
- fabricating a woven fiber preform that is impregnated with a matrix-precursor resin by means of a method according to claim 1;
- placing the fiber preform in a cavity of a mold having the shape of the part that is to be fabricated;
- heating the fiber preform to a softening temperature of the resin in order to liquefy the resin;
- eliminating the air present in the fiber preform;
- compacting the fiber preform in the mold;
- subjecting the resin present in the pores of the fiber preform to polymerization heat treatment so as to obtain a composite material part; and
- unmolding the composite material part.
7. A method according to claim 6, wherein the fabricated part is a fan blade or a fan casing for an aviation turbine engine.
8. A method according to claim 6, wherein the compacting of the fiber preform in the mold includes taking surplus resin that has been discharged from the preform and reinjecting it into the mold so as to maintain a uniform pressure inside the mold cavity.
9. An installation for fabricating a woven fiber preform that is impregnated with a matrix-precursor resin, the installation comprising: a loom, an enclosure storing resin-impregnated yarns or strands, the enclosure being configured to feed the loom with yarns or strands, wherein a temperature inside the enclosure lies in the range from the glass transition temperature $Tg^0$ of the resin in the raw state to $Tg^0+10°C$.
10. An installation according to claim 9, wherein the loom is in the enclosure.

Signed and Sealed this
Seventh Day of September, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)

(12) United States Patent
Most et al.

(10) Patent No.: US 11,052,573 B2
(45) Date of Patent: Jul. 6, 2021

(54) METHOD OF FABRICATING BOTH A WOVEN FIBER PREFORM AND A COMPOSITE MATERIAL PART

(71) Applicant: SAFRAN AIRCRAFT ENGINES, Paris (FR)

(72) Inventors: Vincent Bernard Serge Most, Moissy-Cramayel (FR); Marc-Emmanuel Jean François Techer, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 135 days.

(21) Appl. No.: 16/464,546

(22) PCT Filed: Nov. 20, 2017

(86) PCT No.: PCT/FR2017/053163
§ 371 (c)(1),
(2) Date: May 28, 2019

(87) PCT Pub. No.: WO2018/100263
PCT Pub. Date: Jun. 7, 2018

(65) Prior Publication Data
US 2020/0376716 A1 Dec. 3, 2020

(30) Foreign Application Priority Data
Nov. 29, 2016 (FR) .................... 1661642

(51) Int. Cl.
*B29B 11/16* (2006.01)
*C08J 5/24* (2006.01)
(Continued)

(52) U.S. Cl.
CPC .............. *B29B 11/16* (2013.01); *C08J 5/24* (2013.01); *D03D 15/47* (2021.01); *D03D 25/005* (2013.01);
(Continued)

(58) Field of Classification Search
CPC ........ D03D 15/00; D03D 25/005; D03D 1/00; D03D 2700/014; D10B 2101/12;
(Continued)

(56) References Cited

U.S. PATENT DOCUMENTS

| | | |
|---|---|---|
| 3,461,025 A | 8/1969 | Coleman et al. |
| 6,660,336 B1 | 12/2003 | Frenken et al. |
| 2013/0276421 A1 | 10/2013 | Miura et al. |

FOREIGN PATENT DOCUMENTS

| | | |
|---|---|---|
| CN | 1670105 A | 9/2005 |
| CN | 103282565 A | 9/2013 |

(Continued)

OTHER PUBLICATIONS

International Search Report as issued in International Patent Application No. PCT/FR2017/053163, dated Feb. 21, 2018.
(Continued)

*Primary Examiner* — Camie S Thompson
(74) *Attorney, Agent, or Firm* — Pillsbury Winthrop Shaw Pittman LLP

(57) ABSTRACT

A method of fabricating a woven fiber preform that is impregnated with a matrix-precursor resin, the resin, in the raw state, presenting a glass transition temperature $Tg^0$, includes: impregnating yarns or strands with the resin; feeding a loom with the impregnated yarns or strands maintained at a temperature in the range $Tg^0$ to $Tg^0+10°$ C.; and weaving the yarns or strands in the loom in order to obtain the resin-impregnated woven fiber preform.

10 Claims, 2 Drawing Sheets ;